United States Patent
Schultz

(10) Patent No.: US 9,701,398 B2
(45) Date of Patent: Jul. 11, 2017

(54) METHOD AND APPARATUS FOR AUGMENTED PILOT OPERATIONS OF FLY-BY-WIRE VEHICLES

(71) Applicant: Douglas Allen Schultz, Punta Gorda, FL (US)

(72) Inventor: Douglas Allen Schultz, Punta Gorda, FL (US)

( * ) Notice: Subject to any disclaimer, the term of this patent is extended or adjusted under 35 U.S.C. 154(b) by 0 days.

(21) Appl. No.: 14/727,105

(22) Filed: Jun. 1, 2015

(65) Prior Publication Data
US 2016/0124429 A1    May 5, 2016

Related U.S. Application Data

(60) Provisional application No. 62/074,140, filed on Nov. 3, 2014.

(51) Int. Cl.
| G05D 1/00 | (2006.01) |
| G01C 21/00 | (2006.01) |
| B64C 13/50 | (2006.01) |
| B64C 19/00 | (2006.01) |
| B64D 45/00 | (2006.01) |

(52) U.S. Cl.
CPC ............ *B64C 13/503* (2013.01); *B64C 19/00* (2013.01); *B64D 45/0015* (2013.01); *B64D 2045/0045* (2013.01); *B64D 2045/0055* (2013.01)

(58) Field of Classification Search
CPC ........ B64D 45/0015; B64D 2045/0055; G05D 1/0044; G05D 1/0061
See application file for complete search history.

(56) References Cited

U.S. PATENT DOCUMENTS

| 6,112,140 A | 8/2000 | Hayes et al. |
| 6,584,383 B2 | 6/2003 | Pippenger |
| 6,739,556 B1 * | 5/2004 | Langston ............ B64D 45/0015 244/189 |
| 6,915,986 B2 * | 7/2005 | D'Alvia ................ B64C 1/1469 244/118.5 |

(Continued)

FOREIGN PATENT DOCUMENTS

WO    WO 2013010370 A1 *    1/2013    ......... H04B 7/18506

*Primary Examiner* — Thomas G Black
*Assistant Examiner* — Ce Li
(74) *Attorney, Agent, or Firm* — Maier & Maier, PLLC

(57) ABSTRACT

A system for augmented pilot operations is provided to perform checks and balances between navigable systems and a plurality of controlling parties of a Fly-By-Wire vehicle. A ground based control system having at least one of manual controls and an autonomous piloting system, an electronic communication system including at least one of an onboard communication system, a ground based communication system, and a programmable interface for inter party communication. An on board flight control system including at least one of a primary power unit, manual flight controls, and a programmable flight management system may be provided. An onboard auxiliary navigation system including at least one of an auxiliary power control unit, a ground operated control/navigation unit, a physical barrier may prevent manual override from within the plane or cockpit, and an assignment device. A disagreement detection system may be configured to detect unauthorized use of the Fly-By-Wire vehicle.

2 Claims, 3 Drawing Sheets

(56) References Cited

U.S. PATENT DOCUMENTS

| | | | | |
|---|---|---|---|---|
| 6,917,863 B2* | 7/2005 | Matos | G05D 1/0022 | |
| | | | 244/189 | |
| 7,142,971 B2 | 11/2006 | Brown et al. | | |
| 7,183,946 B2* | 2/2007 | Boudrieau | B64D 45/0015 | |
| | | | 244/189 | |
| 7,406,368 B2* | 7/2008 | Arnouse | B64D 45/0015 | |
| | | | 244/118.5 | |
| 7,475,851 B2 | 1/2009 | Yount et al. | | |
| 7,840,317 B2 | 11/2010 | Matos et al. | | |
| 7,888,813 B2 | 2/2011 | Stoner | | |
| 2003/0052798 A1* | 3/2003 | Hanson | B60R 25/102 | |
| | | | 340/945 | |
| 2003/0071743 A1* | 4/2003 | Seah | B64C 1/1469 | |
| | | | 340/945 | |
| 2003/0201365 A1* | 10/2003 | Nelson | B64D 45/0015 | |
| | | | 244/118.5 | |
| 2004/0267412 A1* | 12/2004 | Arnouse | B64D 45/0015 | |
| | | | 701/2 | |
| 2005/0219064 A1* | 10/2005 | Arnouse | B64D 45/0015 | |
| | | | 340/945 | |
| 2006/0025900 A1* | 2/2006 | Arnouse | B64D 45/0015 | |
| | | | 701/10 | |
| 2006/0032978 A1* | 2/2006 | Matos | B64D 45/0015 | |
| | | | 244/118.5 | |
| 2006/0167598 A1* | 7/2006 | Pennarola | G08G 5/0013 | |
| | | | 701/11 | |
| 2006/0217851 A1* | 9/2006 | McGuffin | H04B 7/18506 | |
| | | | 701/4 | |
| 2007/0029449 A1* | 2/2007 | Matos | G08G 5/0056 | |
| | | | 244/195 | |
| 2008/0255711 A1* | 10/2008 | Matos | B64C 39/024 | |
| | | | 701/2 | |
| 2009/0082913 A1* | 3/2009 | Yount | B64D 45/0015 | |
| | | | 701/11 | |
| 2009/0179114 A1* | 7/2009 | Conner | B64D 45/0015 | |
| | | | 244/189 | |
| 2012/0215384 A1 | 8/2012 | Fritz | | |

* cited by examiner

METHOD AND APPARATUS FOR AUGMENTED PILOT OPERATIONS OF FLY-BY-WIRE VEHICLES

CROSS-REFERENCE TO RELATED APPLICATIONS

This application claims priority to U.S. Provisional Patent Application No. 62/074,140 filed Nov. 3, 2014, the entire contents of which are hereby incorporated by reference.

BACKGROUND

Existing commercial aircraft and other Fly-By-Wire vehicles have been demonstrated to be vulnerable to terrorist attacks, autopilot malfunctions, unauthorized usurpation of control, and use by authorized pilots for unauthorized uses. A multitude of scenarios may arise that subject pilots and passengers within the vehicle and other third parties to vulnerabilities. The multitude of scenarios that may cause drastic failure of a vehicle indicate the need for a customizable system of checks and balances between persons and systems authorized to control said vehicles.

The present invention may provide a customizable system that utilizes manual systems and methods for navigation of a Fly-By-Wire vehicle in conjunction with other relevant systems and methods for navigation that are automated. In an exemplary embodiment the invention may utilize a host of electronic systems to reduce the multitude of security vulnerabilities that passengers, pilots, crewmembers, cargo, and third parties are subjected to by existing aviation practices. A wide range of vulnerabilities render singularly manual and singularly automated control systems unsafe, whether they are onboard the vehicle or controlled by an external ground based control source. For example, an onboard system may malfunction or a pilot or other unauthorized crewmember may usurp control of the vehicle for unauthorized uses. Additionally, complete reliance on ground based controls would subject the passengers to the vulnerabilities associated with a loss of transmission, unauthorized electronic control of ground systems through hacking, or authorized ground based controls intentionally using the vehicle for unauthorized purposes. Accordingly, the public would greatly benefit by an invention that provides for a customizable system of redundant checks and balances between manual and automated navigable control systems.

SUMMARY

A system and method for the checks and balances between onboard and ground based navigation systems for Fly-By-Wire ("FBW") Vehicles may be provided. Interactions between onboard manual and automated flight navigation systems with ground based manual and automated flight control systems may be facilitated for augmented pilot operations of Fly-By-Wire vehicles.

A Fly-By-Wire system allows conventional cockpit controls to manipulate external flight surfaces by use of an electronic or digital transfer system. The digital transfer system may include a processing component which accepts the conventional manual control inputs from the pilot, and transfers them into electronic signals which are then used to operate flight control surfaces used for navigation.

In one exemplary embodiment, the present invention may include a ground based control system having at least one of manual controls and an autonomous piloting system, an electronic communication system including at least one of an onboard communication system, a ground based communication system, and a programmable interface for inter party communication. An on board flight control system including at least one of a primary power unit, manual flight controls, and a programmable flight management system may be provided. An onboard auxiliary navigation system including at least one of an auxiliary power control unit, a ground operated control/navigation unit, a physical barrier that may prevent manual override from within the plane or cockpit, and an assignment device. A disagreement detection system may be configured to detect unauthorized use of the Fly-By-Wire vehicle. The disagreement detection system may additionally detect unauthorized use, and or attempts at use, of the FBW navigation controls in which an individual attempts to hack the FBW system through the planes on board network system. The planes onboard network system may be wireless or wired.

In further exemplary embodiments, the onboard FBW control systems of a vehicle such as, for example, manual controls and autopilot controls, may be rendered powerless by a ground based command station in the event of an emergency, and exclusive navigable control of said vehicle may be maintained by a ground based command station. Once the on board navigable systems are rendered powerless by the ground based command station they may not be regained unless the ground based command station reinstitutes power to the primary FBW control power unit. In the event of a loss of transmission, the onboard autopilot may follow pre-ordained flight paths, possibly to the closest airport for safe landing, as programmed by the Flight Management System. In the event the ground based command station has been compromised, may be malfunctioning, or may have lost control of the FBW vehicle by an improper usurpation of onboard navigation systems, the onboard pilot, crew, or flight management system may request an intervention. An intervention may be performed by an apparatus that communicates the vehicle's distress signal, thereby indicating the onboard pilots' need for an alternate ground based control source. The intervention may not allow the onboard pilot to regain control of the vehicle, but may allow the ground operated control sources to be monitored by the onboard pilot and systems.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION

Figure 1:
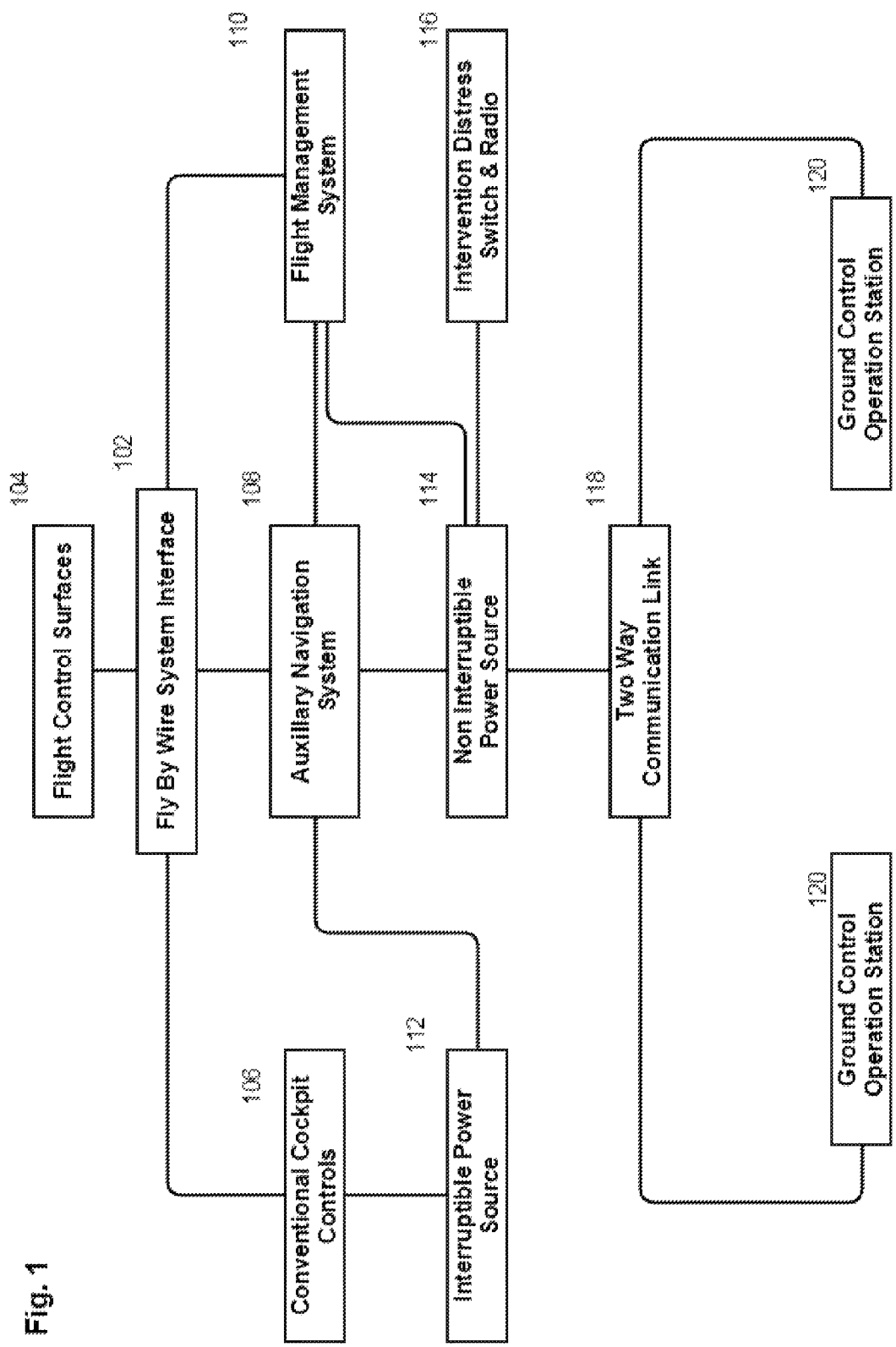
FIG. 1 shows an exemplary embodiment of onboard navigation components.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

Typical aircraft utilize a Fly-By-Wire system including a processing component which accepts the conventional manual control inputs from the pilot electronically. Additionally, Fly-By-Wire systems help stabilize the aircraft by normalizing the conventional manual input from the pilot with automatic adjustment signals in order to prevent unintentional operation of the aircraft away from its best mode of performance. In some exemplary embodiments, the present invention may utilize the dual nature of the Fly-By-Wire system's normalization and electronic interface to provide a means of checks and balances between the onboard human and autopilot features by providing an additional apparatus to promote coordination with ground based human and autonomous piloting capabilities. Additionally a system of checks and balances between navigable systems and controlling parties of a Fly-By-Wire vehicle may be provided.

In further exemplary embodiments, a method and apparatus of providing the system of checks and balances by selecting from a multitude of control options, and assigning the appropriate control input based upon the particular circumstances encountered may be provided. An apparatus may be customized and programmed for specific uses and thresholds of intervention between the various controlling inputs.

In some exemplary embodiments, the apparatus may include a ground based control system comprising manual controls and autonomous piloting system(s); an electronic communication system comprising onboard communication system(s), ground based communication system(s), and a programmable interface for inter party communication. An on board flight control system may include a primary power unit, manual flight controls, and a programmable flight management system. An onboard auxiliary navigation system may include an auxiliary power control unit, a ground operated control/navigation unit, a physical barrier which may prevent manual override from within the plane or cockpit, and an assignment device. A disagreement detection system to detect unauthorized use of a Fly-By-Wire vehicle as controlled by either the ground based control system(s) or onboard control system(s).

In similar fashion the invention may utilize a method of monitoring FBW vehicles and intervening in the piloting of FBW vehicles according to the following steps.

A ground based control and operation station ("GBCOS") including manual control mechanisms capable of remotely piloting FBW vehicles, and an autonomous piloting system that may be capable of remotely piloting FBW vehicles, may monitor FBW vehicles with the intention of preventing unauthorized use. In the event of an unauthorized use the GBCOS may assume control of the Fly-By-Wire vehicle by means of a two way communication link that removes power from the cockpit controls, which may prevent the manual controls from communicating with the FBW computer processor. Simultaneously, the FBW computer processor may receive controlling inputs from the GBCOS via the onboard auxiliary navigation system and communication link. At this point the FBW computer processor may be controlled exclusively by a GBCOS. After the powering down of the cockpit controls and transferring exclusive piloting control to the auxiliary navigation system the GBCOS may navigate the plane by: manual control mechanisms, autonomous control systems, or both.

In some exemplary embodiments of the aforementioned method, the apparatus may be used to transfer sole navigable authority to a GBCOS that has previously been monitoring the vehicle. The onboard vehicle stabilization features and onboard flight management system may assist the GBCOS.

In some exemplary embodiments a solution to the unauthorized entry or usurpation of FBW vehicle is disclosed. For example, in the event that a FBW vehicle's security may be compromised due to an unknown alternate unauthorized entity. This entity may be, for example, an onboard passenger capable of accessing the onboard networking system of the FBW vehicle. In the event control of a FBW vehicle is lost because of an unauthorized accessing of the FBW networking system, such as by hacking into the network architecture through wireless or physical wires any of the following may happen. The disagreement detection system may notify the piloting members of the airplane and the ground based control station. The ground based control station may then assume exclusive control of the FBW navigation system by rendering all onboard piloting systems functionless. The onboard piloting systems may be rendered functionless by a ground based control and operation by removing the power to the cockpit controls. Alternatively, if required, the ground based control and operation station may remove the power to the entire FBW vehicle with the exception of critical life support infrastructure. The pilot may request an intervention of the FBW vehicle by utilizing the intervention distress signal and a ground based control and operation station may assume exclusive control. The processing component of the FBW system may notify the pilot and ground based control and operation station that it is receiving interference, or other electronic signals, from a non-authenticated source. Additionally, in the event any monitored FBW system, such as engine speed, vehicle speed and bearing, elevation abruptly changes the disagreement detection system will notify the pilot and ground based control station.

In some exemplary embodiments of the system, the onboard passenger communication, entertainment, and network systems are isolated from the onboard navigation systems. The navigable systems of the FBW vehicle are limited to control from within the cockpit or alternatively from a ground based control station. Additionally, a separate communication system for onboard internet access and local onboard network access is maintained. This first communication system is isolated from the two way communication system that a ground based control station may utilize to control a FBW vehicle.

In some exemplary embodiments of the system the onboard flight management system may only be programmed by an authorized authenticated source. The onboard pilot and the ground based control station may both review the programmed flight management system for accuracy and safety before the vehicle reaches a pre-determined speed and altitude. After the vehicle exceeds the pre-determined speed and altitude the flight management system may be programmed by the ground based control and operation station exclusively. There is no means for any onboard system to modify the programming of the flight management system.

In some exemplary embodiments of the system the flight management system, disagreement protection system, communication system, FBW processing component, and the ground based control and operation station, are protected by a firewall. The firewall may be used to authenticate security credentials to prevent the unauthorized usurpation or modification of controls of the system.

In an exemplary embodiment a physical barrier may be provided to prevent unauthorized usurpation of control of a FBW vehicle. For example, a Plexiglass panel, that only the pilot or other authorized individual may release, is utilized to block access to the FBW vehicle's avionics system. Additionally, all circuit breakers on the FBW vehicle may have a physical barrier to prevent authorized access to all circuit breakers which may cover all electrical control systems of said FBW vehicle.

Referring to FIG. 1, The first exemplary embodiment may be represented by a Block Diagram as shown in FIG. 1, which includes a vehicle with a Fly-By-Wire System and Interface 102 that can control all of the major Flight Control Systems and Surfaces 104 of the vehicle including but not limited to; the throttle, wing flaps, control yoke, rudder, pedals, and landing gear by Conventional Cockpit Controls 106. The Conventional Cockpit Controls 106 may be electrically powered by an Interruptible Power Switch 112, that may be controlled by the Auxiliary Navigation System 108. The Auxiliary Navigation System 108, the Two Way Communication Link 118, the Flight Management System 110, and Intervention Distress Switch 116, may be powered by a Non-Interruptible Power Source 114. The Auxiliary Navigation System 108 may communicate with a Ground Based Control and Operation Station 120. In the event the Ground Based Control and Operation Station 120 intends to remove Conventional Cockpit Control 106 of the Fly-By-Wire System Interface 102, the Auxiliary Navigation System 108 may remove power to the Conventional Cockpit Controls 106 by the Interruptible Power Switch 112. The intervention distress radio and switch 116 may be located in the cockpit or alternate locations on the airplane as would be understood by a person of ordinary skill in the art. The intervention distress radio and switch 116 may maintain power in the event the Conventional Cockpit Controls 106 loses power as a result of the Interruptible Power Switch 112. The intervention distress radio and switch 116 may maintain power and access to the Two Way Communication Link 118 at all times.

In further exemplary embodiments, a means may be provided for onboard flight members to request a controlling intervention in the event that a particular GBCOS assumes control of the vehicle for an unauthorized use by utilization of a switching protocol. The switching protocol may allow the onboard human pilot or crewmembers to maintain communication with multiple GBCOS to further enhance security of the vehicle.

The method to initiate a switching of control may preferably be performed by sending a distress signal to the particular GBCOS, an alternate GBCOS, and/or a coordinated network of GBCOS's simultaneously. The distress signal may be interpreted by the GBCOS and responding signals may be interpreted by the Auxiliary Navigation System 108. The particular GBCOS that has assumed control may assign an alternate on site control source for the vehicle. An alternate GBCOS may assume control of the aircraft provided the auxiliary navigation system approves the switch, thereby removing control of the aircraft from the initial GBCOS. The intervention may not allow the onboard pilot to regain control, but may allow the onboard crew to check and balance the specific GBCOS that has assumed control of FBW vehicle. The GBCOS may relinquish control to the onboard navigation systems on an as needed basis.

In some exemplary embodiments, an intervention may not occur automatically. Rather, an intervention may be a calculated decision made by the onboard auxiliary navigation system. The auxiliary navigation system may not transfer controlling authority of the aircraft until appropriate. The auxiliary navigation system may rely on, but is not limited to, the following when performing a safety assessment: the altitude, the wind speed and direction, the proximity of other aircraft, the aircraft speed, or other factors as would be understood by a person of ordinary skill in the art. The Auxiliary Navigation system may be programmable for various detection parameters. In the event an onboard pilot or crewmember has requested multiple interventions, the onboard auxiliary navigation system may choose to ignore the distress signal. In the event of nearby terrain or other objects the auxiliary navigation system may not transfer navigable authority.

Figure 2:
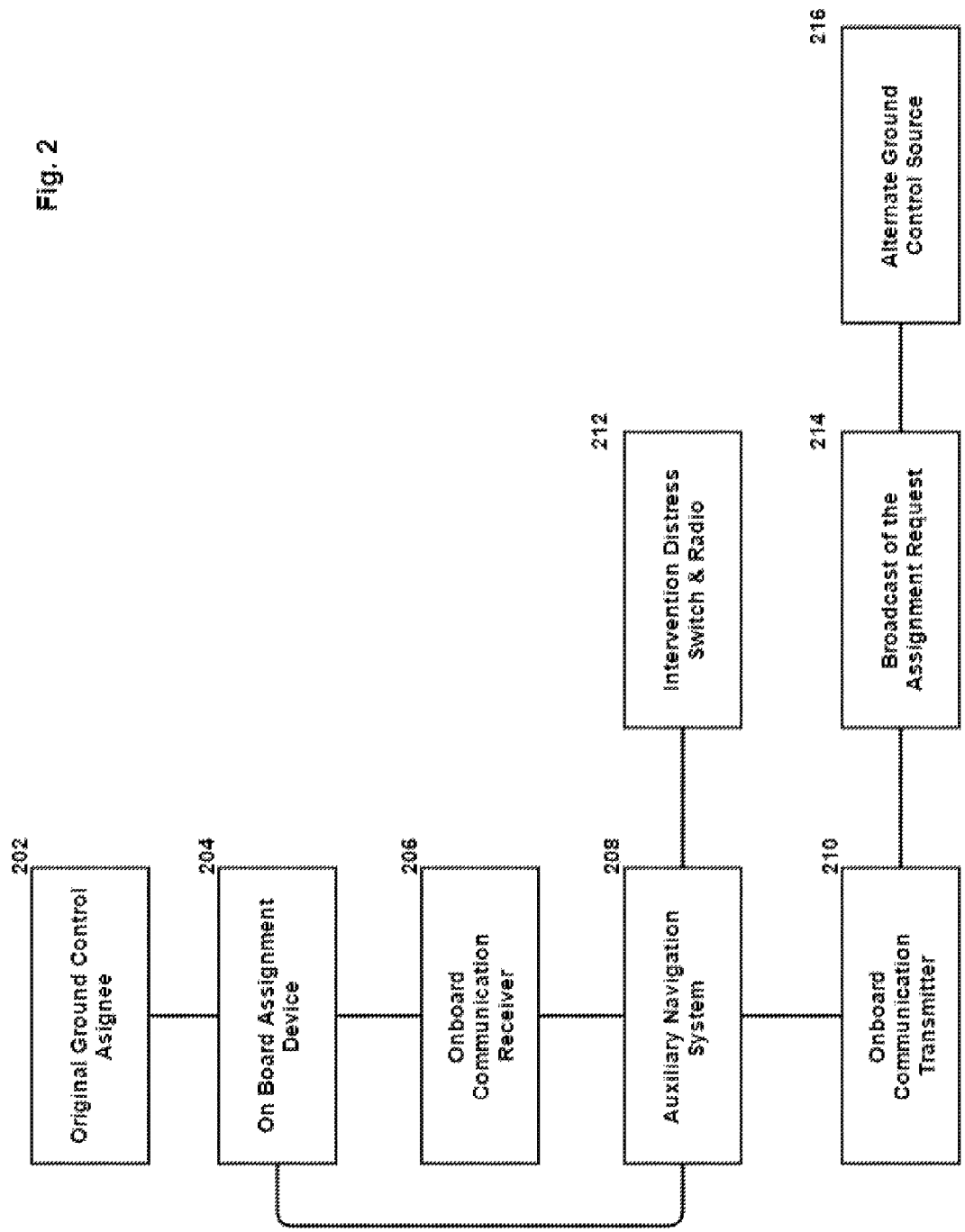
FIG. 2 shows an exemplary embodiment of a Switching System Assignment Device.

Referring now to FIG. 2, another exemplary embodiment may be represented by a block diagram depicting the Switching System. In the event that an Original Ground Control Assignee 202 has assumed control of the vehicle by utilizing the Auxiliary Navigation System 208, an onboard pilot or crewmembers may request an intervention, for example, in the case of a malfunctioning signal or unauthorized ground control by the Intervention Distress Radio and Switch 212. The Intervention Distress Radio Switch may send a signal to the Auxiliary Navigation System 208, which may then determine if it is appropriate to send a request to an Alternate Ground Control Source 216, by the Onboard Communication Transmitter 210. In the event the Auxiliary Navigation System determines it is appropriate to transmit an Assignment Request 214 via the Communication Transmitter 210 to an Alternate Ground Control Source 216, and an Alternate Ground Control Source has the resources to accept the request, a confirmation may be sent to the Assignment Device 204. The Assignment Device 204, with the coordination of the Auxiliary Navigation System 208, may remove the Original Ground Control Assignee and may establish a secure connection with the Alternate Ground Control Source 216.

In further exemplary embodiments, the system and method of the present invention may provide for efficient checks and balances between ground based manual controls and autonomous operation controls. This may be achieved, for example, by utilizing additional Ground Based Control and Operation Stations that are in coordination. Additionally, a GBCOS Computing System may allow for the real time collection of data to promote efficient traffic density and optimize taxi time between runways. Furthermore, the GBCOS Computing System may allow for one human operator to potentially oversee the Autonomous Control of multiple aircraft, thereby reducing administrative costs.

Figure 3:
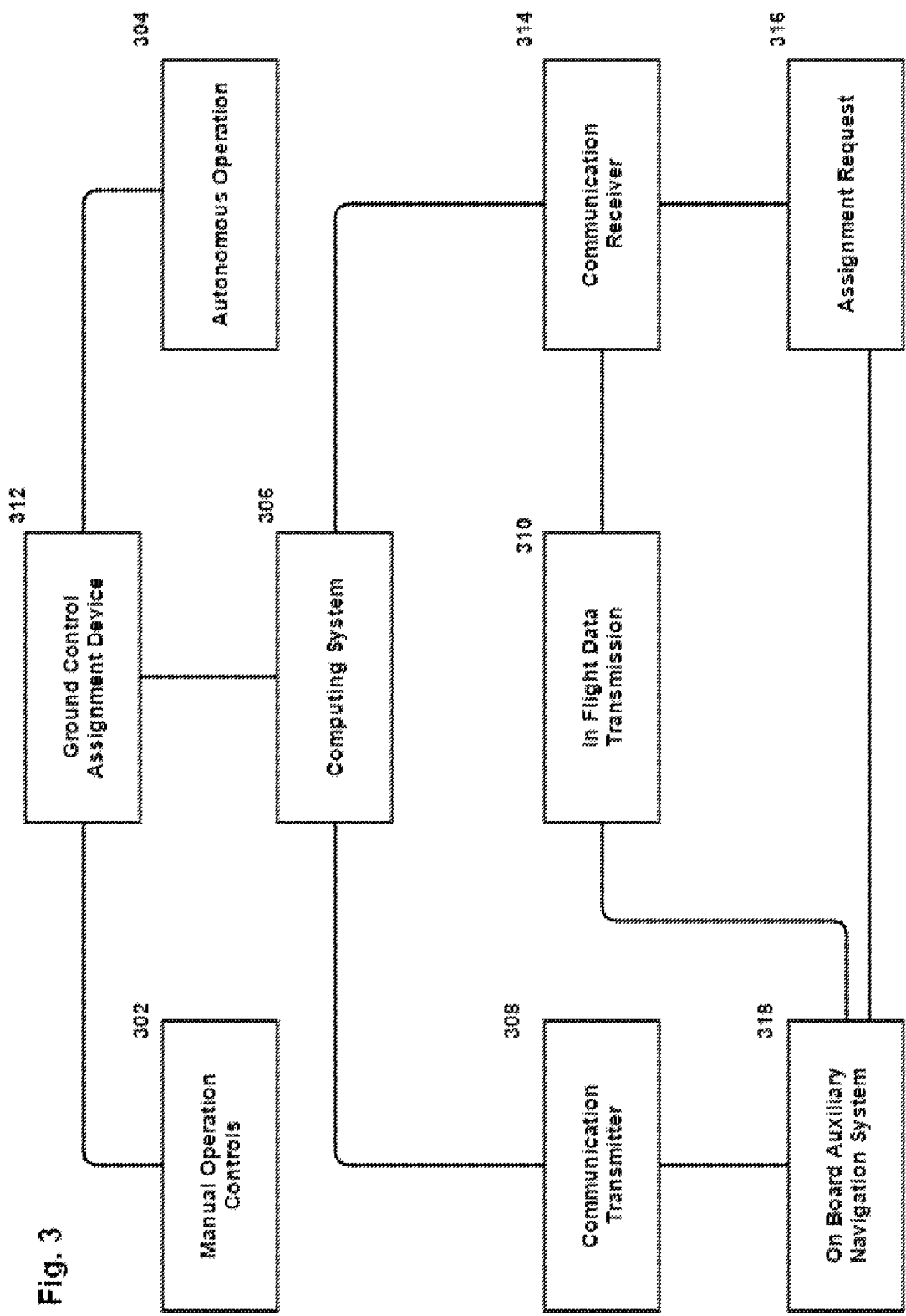
FIG. 3 shows an exemplary embodiment of a Ground Control Operation Station.

Referring to FIG. 3, a further exemplary embodiment may be provided to define the Ground Based Control and Operation Stations. Manual Operation Controls 302, in coordination with Autonomous Operation Control(s) 304 may be linked to the Computing System 306, and Ground Control Assignment Device 312. The Assignment Device and the computing system may work together in parallel to control the scope of control between the Autonomous Operation 304, and Manual Operation 302. The Ground Based Communication Receiver 314, may receive in Flight Data 310 in the event that the assignment device institutes a controlling protocol to either the Autonomous Operation 304 or the Manual Operation 302, or both. Additionally the Ground Based Communication Receiver may receive a Request for Assignment 316 from an alternate source, such as a vehicle or alternate command station. The Ground Based Computing System 306 may determine if and when a request for assignment can be established. The Ground Based Computing System 306 may communicate controlling protocol with the Auxiliary Navigation System 318 via the Ground Based Communication Transmitter 308. The Ground Based Computing System receives In Flight Data 310 from the onboard two way communication link of the vehicle. This information may be received by the Communication Receiver 310 and may relay this information to either the Autonomous Operation 304 or the Manual Operation 302, or both.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for requesting an intervention of a fly-by-wire vehicle comprising:
   sending an intervention request from onboard the fly-by-wire vehicle for an alternate controlling source;
   receiving confirmation of an intent to intervene from the alternate controlling source;
   processing confirmation of the intent to intervene by way of an auxiliary navigation system on board the aircraft;
   switching the controlling source of the fly-by-wire vehicle by allowing the auxiliary navigation system to remove power from conventional cockpit controls by way of an interruptible power switch;
   detecting a subsequent intervention request by an on-board distress switch;
   allowing the auxiliary navigation system to analyze flight data and determine if it is appropriate to request intervention by a second alternate controlling source; and
   when the auxiliary navigation system determines it is appropriate to request intervention by a second alternate controlling source, sending a subsequent distress signal from onboard the fly-by-wire vehicle to request a controlling intervention by the second alternate controlling source.

2. The method of claim 1, wherein the auxiliary navigation system is configured to approve a switch to the second alternate controlling source and remove control from the initial alternate controlling source.

* * * * *